United States Patent
Vasseur

(10) Patent No.: US 8,976,645 B2
(45) Date of Patent: *Mar. 10, 2015

(54) DYNAMIC PROTECTION AGAINST FAILURE OF A HEAD-END NODE OF ONE OR MORE TE-LSPS

(71) Applicant: Cisco Technology, Inc., San Jose, CA (US)

(72) Inventor: Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/872,755

(22) Filed: Apr. 29, 2013

(65) Prior Publication Data

US 2013/0235716 A1  Sep. 12, 2013

Related U.S. Application Data

(63) Continuation of application No. 11/334,151, filed on Jan. 18, 2006, now Pat. No. 8,441,919.

(51) Int. Cl.
| | |
|---|---|
| H04L 12/24 | (2006.01) |
| H04L 12/66 | (2006.01) |
| H04L 12/701 | (2013.01) |
| H04L 12/721 | (2013.01) |
| H04L 12/707 | (2013.01) |
| H04L 12/703 | (2013.01) |
| H04L 12/723 | (2013.01) |

(52) U.S. Cl.
CPC ............ *H04L 41/0659* (2013.01); *H04L 12/66* (2013.01); *H04L 41/0668* (2013.01); *H04L 45/00* (2013.01); *H04L 45/12* (2013.01); *H04L 45/22* (2013.01); *H04L 45/28* (2013.01); *H04L 45/502* (2013.01)
USPC ....................................................... 370/221

(58) Field of Classification Search
None
See application file for complete search history.

(56) References Cited

U.S. PATENT DOCUMENTS

| | | | |
|---|---|---|---|
| 6,628,649 | B1 | 9/2003 | Raj et al. |
| 6,751,190 | B1 | 6/2004 | Swallow |
| 6,778,492 | B2 | 8/2004 | Charny et al. |
| 6,831,898 | B1 | 12/2004 | Edsall et al. |
| 6,850,486 | B2 | 2/2005 | Saleh et al. |
| 6,978,394 | B1 | 12/2005 | Charny et al. |
| 7,120,151 | B1 | 10/2006 | Ginjpalli et al. |

(Continued)

OTHER PUBLICATIONS

Awduche, D., RFC 3209, entitled RSVP-TE: Extensions to RSVP for LSP Tunnels, Dec. 2001, 1-57.

(Continued)

*Primary Examiner* — Ian N Moore
*Assistant Examiner* — Brian T Le
(74) *Attorney, Agent, or Firm* — Novak Druce Connolly Bove + Quigg LLP

(57) ABSTRACT

In one embodiment, a repair label switched path (LSP) is established for a primary LSP having a head-end node. The repair LSP extends from a neighboring upstream node of the head-end node to a downstream neighboring node of the head-end node. When a failure of the head-end node is detected, the neighboring upstream node reroutes traffic onto the repair LSP. The rerouted traffic rejoins the primary LSP at the downstream neighboring node. The neighboring upstream node refreshes state of the primary LSP to maintain the primary LSP after failure of the head-end node.

16 Claims, 12 Drawing Sheets

(56) References Cited

U.S. PATENT DOCUMENTS

| | | |
|---|---|---|
| 7,269,132 B1 | 9/2007 | Casey et al. |
| 2002/0093954 A1 | 7/2002 | Weil et al. |
| 2003/0063613 A1 | 4/2003 | Carpini et al. |
| 2003/0088698 A1 | 5/2003 | Singh et al. |
| 2003/0126287 A1 | 7/2003 | Charny et al. |
| 2003/0131131 A1 | 7/2003 | Yamada et al. |
| 2003/0210705 A1 | 11/2003 | Seddigh et al. |
| 2003/0233595 A1 | 12/2003 | Charny et al. |
| 2004/0083278 A1 | 4/2004 | Becherer |
| 2004/0090913 A1 | 5/2004 | Scudder et al. |
| 2004/0109687 A1 | 6/2004 | Park et al. |
| 2004/0133619 A1* | 7/2004 | Zelig et al. ............... 709/200 |
| 2004/0196827 A1 | 10/2004 | Xu et al. |
| 2005/0002339 A1 | 1/2005 | Patil et al. |
| 2005/0013242 A1 | 1/2005 | Chen et al. |
| 2005/0083928 A1 | 4/2005 | Sivabalan et al. |
| 2005/0097219 A1 | 5/2005 | Goguen et al. |
| 2005/0111351 A1 | 5/2005 | Shen |
| 2005/0213508 A1 | 9/2005 | Gerstel |
| 2005/0281192 A1* | 12/2005 | Nadeau et al. ............ 370/217 |
| 2006/0285486 A1 | 12/2006 | Roberts et al. |
| 2007/0008895 A1 | 1/2007 | Perkins et al. |
| 2007/0053284 A1* | 3/2007 | Hu ........................... 370/217 |
| 2008/0304494 A1 | 12/2008 | Yokoyama |
| 2009/0292943 A1 | 11/2009 | Hanif et al. |

OTHER PUBLICATIONS

Berger, L., RFC 3473 entitled, Generalized Multi-Protocol Label Switching (GMPLS) Signaling Resource ReserVation Protocol-Traffic Engineering (RSVP-TE) Extensions, Jan. 2003, pp. 1-40.

Braden, R. et al., RFC 2205, entitled Resource ReSerVation Protocol (RSVP), Version 1 Functional Specification, Sep. 1997, pp. 1-105.

Callon, R., RFC 1195, entitled Use of OSI ISIS for routing in TCP/IP and Dual Environments, Dec. 1990, pp. 1-80.

Coltun, R., RFC 2370, entitled The OSPF Opaque LSA Option, Jul. 1998, pp. 1-15.

Katz, D. et al., RFC 3630, entitled Traffic Engineering (TE) Extensions to OSPF Version 2, Sep. 2003, pp. 1-14.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Moy, J., RFC 2328, entitled OSPF Version 2, Apr. 1998, pp. 1-204.

Pan, P., et al., RFC 4090, entitled Fast Reroute Extensions to RSVP-TE for LSP Tunnels, May 2005, pp. 1-36.

Perlman, Radia, "Interconnections Second Edition: Bridges, Routers, Switches, and Internetworking Protocols", Sections 12.2.4 pp. 317-319, Addison Wesley Longman, Inc. 2000.

PCT Notification of Transmittal of the International Search Report and the Written Opinion of the International Searching Authority, or the Declaration, International Application No. PCT/US07/00464, International Filing Date: Jan. 8, 2007, Date of Mailing Nov. 6, 2007, 9 pages.

Rekhter, Y. et al., RFC 1771, "A Border Gateway Protocol 4 (BGP-4)", Network Working Group, Mar. 1995, pp. 1-54.

Smit, H., RFC 3784 entitled, Intermediate-System-to-Intermediate-System (IS-IS) Extensions for Traffic Engineering (TE), Jun. 2004, pp. 1-13.

Supplementary European Search Report, European Application No. 07709633.7-1525 / 1974226, PCT/US2007/000464, Applicant: Cisco Technology, Inc., Dec. 28, 2009, pp. 1-7.

U.S. Appl. No. 11/001,349, entitled Propagation of Routing Information in RSVP-TE for Inter-Domain TE-LSPs, filed Dec. 1, 2004 by Vasseur et al.

U.S. Appl. No. 11/141,567, entitled System and Method for Protecting Against Failure of a TE-LSP Tail-End Node, filed May 31, 2005 by Vasseur et al.

Vasseur, et al., "Definition of an RRO Node-ID Subobject", draft-ietf-mpls-nodeid-subobject-07.txt, Network Working Group IETF Internet Draft, Nov. 2005, 9 pages.

Vasseur, J.P. et al., Network Working Group Internet Draft, entitled Path Computation Element (PCE) Communication Protocol (PCEP)—Version 1 (draft-ietf-pce-pcep-00.txt), Nov. 2005, pp. 1-46.

\* cited by examiner

DYNAMIC PROTECTION AGAINST FAILURE OF A HEAD-END NODE OF ONE OR MORE TE-LSPS

RELATED APPLICATIONS

The present application is a continuation of U.S. patent application Ser. No. 11/334,151 filed on Jan. 18, 2006 by Jean-Philippe Vasseur, entitled "Dynamic Protection Against Failure of a Head-End Node of One or More TE-LSPS", the contents of which are incorporated herein by reference in their entirety.

BACKGROUND OF THE INVENTION

1. Field of the Invention

The present invention relates to computer networks and more particularly to protection against failure of a head-end node of one or more Traffic Engineering Label Switched Paths (TE-LSPs) in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

An example of an inter-domain routing protocol is the Border Gateway Protocol version 4 (BGP), which performs routing between domains (ASes) by exchanging routing and reachability information among neighboring inter-domain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4* (BGP-4), published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build end-to-end tunnels based on a series of constraints through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. A PCC can be informed of a PCE either by pre-configuration by an administrator, or by a PCE Discovery (PCED) message ("advertisement"), which is sent from the PCE within its area or level or across the entire AS to advertise its services.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

A common practice in TE-enabled networks consists of deploying a mesh of TE-LSPs between a plurality of edge devices (provider edge, or PE routers) through a core network of fewer (generally large capacity) routers (provider, or P routers). In a mesh between PE routers (e.g., a "full mesh"), each PE router on one side of the core is connected to each PE router on the other side of the core via one or more TE-LSPs. The mesh of TE-LSPs provides various benefits within the network, as known to those skilled in the art. In certain network configurations (e.g., with a large number of PE routers), however, this results in a large number of TE-LSPs throughout the network. For example, in the event there are 100 PE routers in the core network (e.g., 50 PE routers on each side), a total of 9,900 TE-LSPs are necessary to create a full mesh with unidirectional TE-LSPs. Generally, there are more (e.g., 5 to 10 times more) PE routers than there are P routers in the network, so one solution to limit the number of TE-LSPs in the network consists of creating a mesh of TE-LSPs between the P routers, and not the PE routers. This may significantly reduce the number of TE-LSPs, such as by a factor of, e.g., 25-100. The PE routers may then communicate with the P routers through conventional routing, e.g., IP/MPLS routing.

Occasionally, a network element (e.g., a node or link) fails, causing redirection of the traffic that originally traversed the failed network element to other network elements that bypass the failure. Generally, notice of this failure is relayed to the nodes in the same domain through an advertisement of the new network topology, e.g., an IGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, including, inter alia, Fast Reroute (FRR), e.g., MPLS TE FRR. An example of MPLS TE FRR is described in Pan, et al., *Fast Reroute Extensions to RSVP-TE for LSP Tunnels* <draft-ietf-mpls-rsvp-lsp-fastreroute-07.txt>, RFC 4090, dated May 2005, which is hereby incorporated by reference as though fully set forth herein.

FRR has been widely deployed to protect against network element failures, where "backup tunnels" are created and set up a priori (before the occurrence of the failure) to bypass a protected network element (e.g., links, shared risk link groups (SRLGs), and nodes). When the network element fails, traffic is quickly rerouted over a backup tunnel to bypass the failed element, or more particularly, in the case of MPLS, a set of TE-LSP(s) is quickly rerouted. Specifically, the point of local repair (PLR) configured to reroute the traffic inserts ("pushes") a new label for the backup tunnel, and the traffic is rerouted accordingly. Once the failed element is bypassed, the backup tunnel label is removed ("popped"), and the traffic is routed along the original path according to the next label (e.g., that of the original TE-LSP, or that expected by the node receiving the rerouted TE-LSP). Notably, the backup tunnel, in addition to bypassing the failed element along a protected primary TE-LSP also intersects the primary TE-LSP, i.e., it begins and ends at nodes along the protected primary TE-LSP. As such, there is currently no known method to protect against a failure of the TE-LSP head-end node using FRR. One example, however, of a tail-end node protection scheme is described in commonly-owned co-pending U.S. patent application Ser. No. 11/141,567, entitled SYSTEM AND METHOD FOR PROTECTING AGAINST FAILURE OF A TE-LSP TAIL-END NODE, filed by Vasseur on May 31, 2005, the contents of which are hereby incorporated in its entirety.

There remains a need, therefore, for a system and method for protecting against a failure of a head-end node of a TE-LSP, e.g., using FRR and backup tunnels. In particular, a need remains to increase the recovery scope (e.g., for FRR) of P-to-P TE-LSP mesh networks, while preserving scalability as compared to PE-to-PE full mesh networks.

SUMMARY OF THE INVENTION

The present invention is directed to a technique for dynamically protecting against failure of a head-end node of one or more primary Traffic Engineering Label Switched Paths (TE-LSPs) in a computer network. According to the novel technique, a neighboring upstream node ("protecting node") of the head-end node learns of the primary TE-LSPs (and their respective state control blocks) extending from the head-end node to one or more address prefixes. The protecting node establishes a repair TE-LSP for each of the primary TE-LSPs to a corresponding downstream neighboring node of the head-end node (a "next-next-hop"). In response to detecting a failure of the head-end node, the protecting node locally reroutes traffic destined for the address prefixes to an appropriate repair TE-LSP. Due to the failure of the head-end node, the protecting node then refreshes the states of the primary TE-LSPs using replicated state control blocks accordingly, until the repair TE-LSPs are no longer needed.

In accordance with one aspect of the present invention, the head-end node may request failure protection from one or more neighboring protecting nodes. Illustratively, the protecting node may learn of the primary TE-LSPs to one or more address prefixes for which the head-end node requests protection, along with their respective state control blocks, through the use of local Interior Gateway Protocol (IGP) messages or through the use of a "fake" unconstrained TE-LSP to the head-end node. Each state control block may contain a next-next-hop address for each primary TE-LSP. Once the necessary information is obtained, the protecting node establishes a repair TE-LSP for each of the primary TE-LSPs to a corresponding next-next-hop, and associates the address prefixes of interest with the repair TE-LSPs.

In accordance with another aspect of the present invention, the protecting node detects head-end node failure and begins to locally reroute traffic of the protected address prefixes onto corresponding repair TE-LSPs. The traffic on the repair TE-LSPs joins the primary TE-LSP at the next-next-hop, or remerge point (RP), and continues to the address prefixes along the primary TE-LSPs. In order to refresh the states of the primary TE-LSPs in the absence of a head-end node, the protecting node sends replica state control blocks (e.g., Path messages) to the RP, which forwards the state control blocks along the primary TE-LSP according to an appropriate label. Notably, because multiple ups stream protecting nodes may exist for the same primary TE-LSPs, the RP is configured to expect identical state control blocks from different sources. In return, the RP also sends returned state control blocks, e.g., Resv messages, to each upstream protecting node. The states of the primary TE-LSPs may be refreshed until they are no longer needed, e.g., when the network reconverges, and the traffic may be routed according to the reconverged routes.

Advantageously, the novel technique dynamically protects against failure of a head-end node of one or more primary TE-LSPs in a computer network. By establishing repair TE-LSPs around the head-end node, the novel technique allows a protecting node to quickly reroute traffic onto the repair TE- LSPs to the primary TE-LSPs in the event of head-end node failure. In particular, the use of repair TE-LSPs may increase the recovery scope of provider node (P)-to-P TE-LSP mesh networks, while preserving scalability as compared to provider edge node (PE)-to-PE TE-LSP mesh networks. Also, TE techniques may be advantageously applied to the repair TE-LSPs, as will be understood by those skilled in the art. Further, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
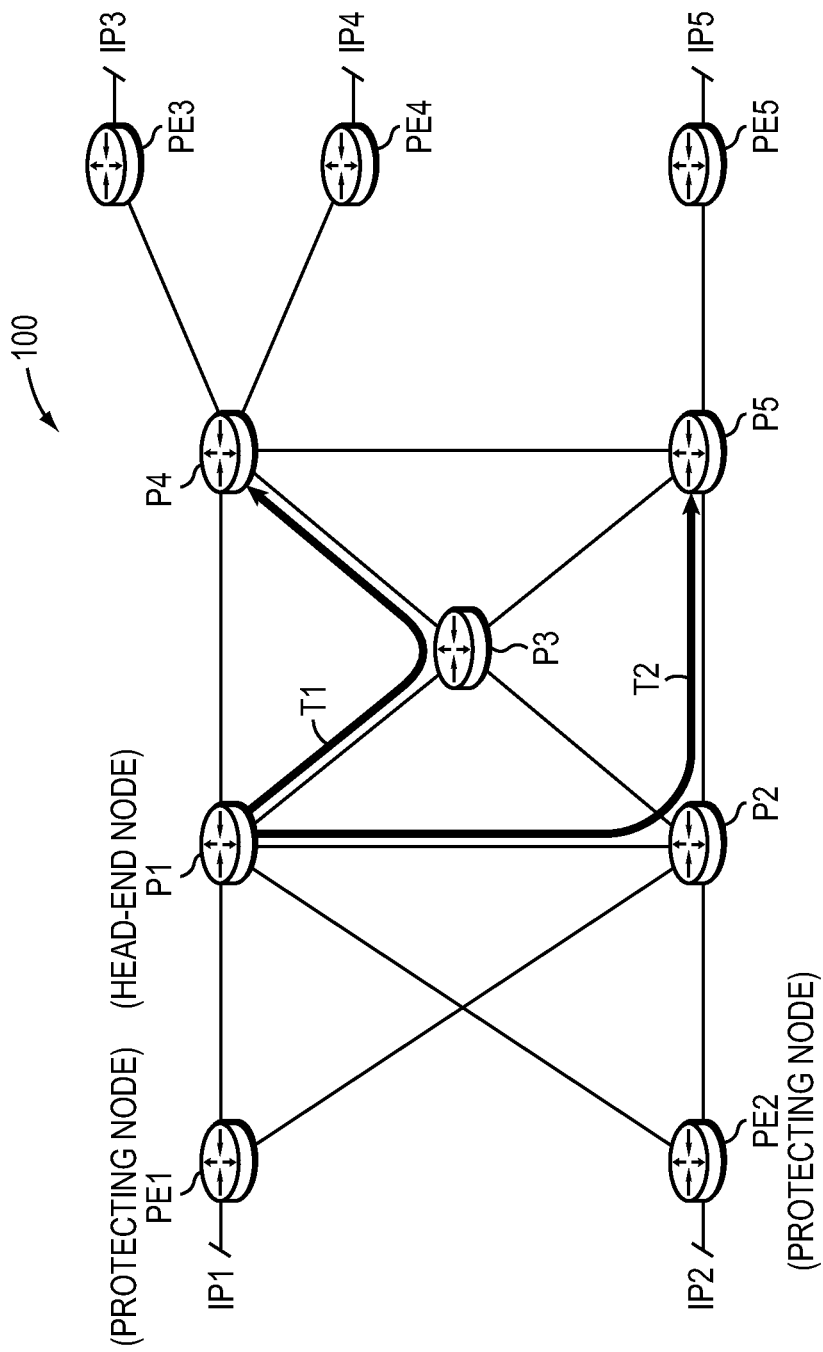
FIG. 1 is a schematic block diagram of an exemplary computer network that may be used in accordance with the present invention.

FIG. 1 is a schematic block diagram of an exemplary computer network 100 comprising edge devices (provider edge routers) PE1 and PE2 interconnected to PE3, PE4, and PE5 by provider (core) routers P1-P5 (e.g., through links as shown). A core router is generally defined as a router that is part of a core or "backbone" (i.e., the collection of provider routers P1-P5) that serves as a "pipe" through which all traffic from peripheral networks must pass on its way to other peripheral networks. Because of this, the core routers (and the links connecting them) are commonly designed to accommodate a high volume of traffic, such as, e.g., links with 2.5 GB (gigabytes) or 10 GB of bandwidth (such as optical connections OC48 or OC192, respectively). The edge routers PE1-PE5 may connect to the peripheral networks, and act as access points (points of presence, POPs, e.g., possibly including provider routers) to the computer network for other devices of the peripheral networks. Illustratively, address prefixes IP1-IP5 are reachable via routers PE1-PE5, respectively. Notably, the core may be organized as a meshed network, in which the devices are organized in a manageable, segmented manner known to those skilled in the art. Moreover, each edge router (PE1-PE5) may be connected to multiple core routers (e.g., in a "mesh" fashion) over a Local Area Network (LAN), providing redundancy for each edge router to the core. Those skilled in the art will understand that any number of routers and nodes may be used in the computer network, and that the view shown herein is for simplicity. Those skilled in the art will also understand that while the present invention is described in terms of a core network with P and PE routers, any network configuration and any arrangement of nodes and/or routers may be used in accordance with the present invention.

Data packets may be exchanged among the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the computer network using predetermined Interior Gateway Protocols (IGPs), such as conventional distance-vector protocols or, illustratively, link-state protocols, through the use of IGP Advertisements.

Figure 2:
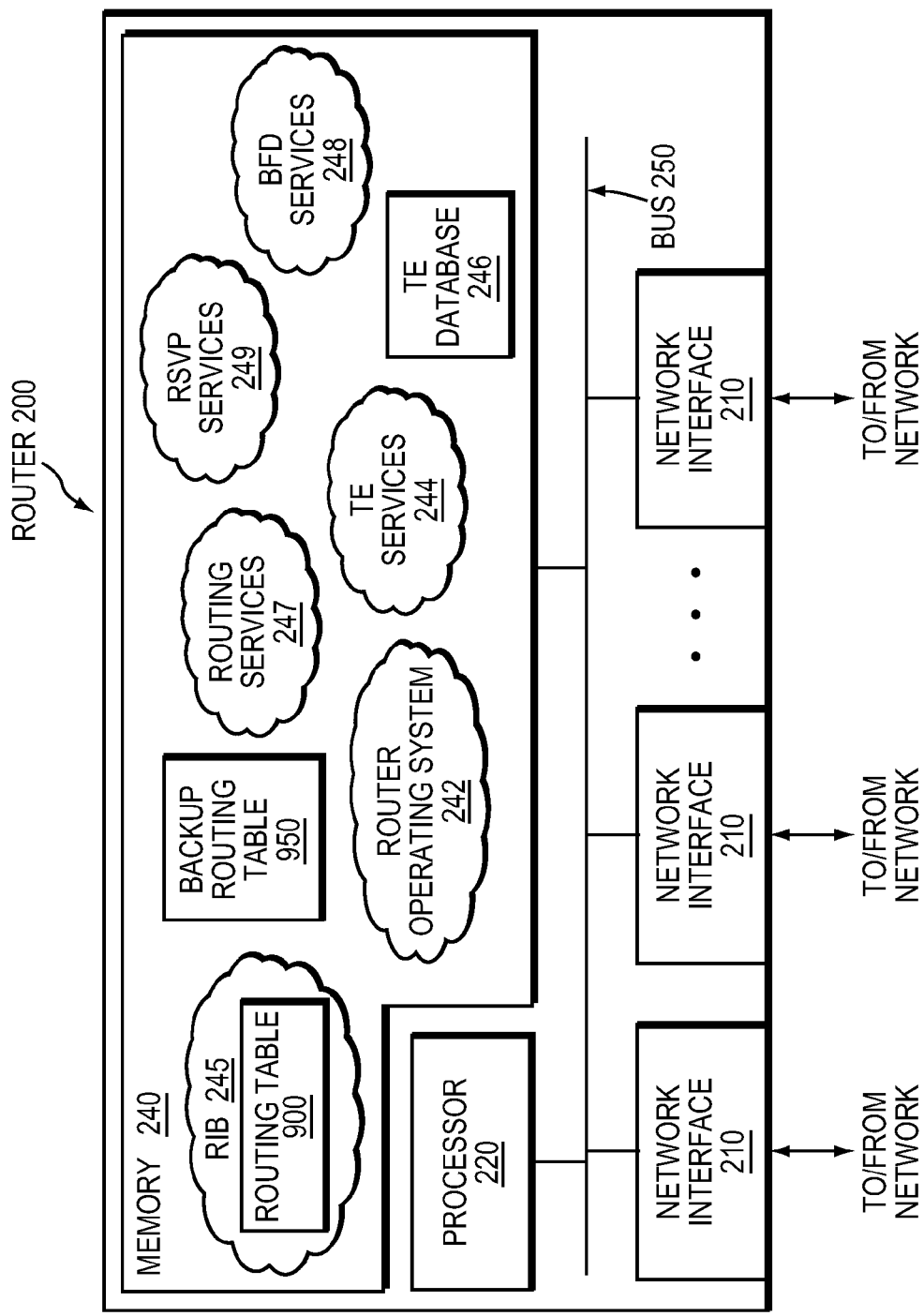
FIG. 2 is schematic block diagram of an exemplary router that may be advantageously used with the present invention.

FIG. 2 is a schematic block diagram of an exemplary router 200 that may be advantageously used with the present invention, e.g., as an edge router or a core router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as TE Database (TED) 246, routing table 900 and backup routing table (BRT) 950. A router operating system 242 (e.g., the Internetworking Operating System, or IOS™, of Cisco Systems, Inc.), portions of which is typically resident in memory 240 and executed by the processor, functionally organizes the router by, inter alia, invoking network operations in support of software processes and/or services executing on the router. These software processes and/or services may comprise Router Information Base (RIB) 245, routing services 247, Traffic Engineering (TE) services 244, Bidirectional Forwarding Detection (BFD) services 248, and Resource ReSerVation Protocol (RSVP) services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., OSPF and IS-IS), IP, BGP, etc. These functions may be configured to manage a forwarding information database (not shown) containing, e.g., data used to make forwarding decisions. Routing services 247 may also perform functions related to virtual routing protocols, such as maintaining VRF instances (not shown) as will be understood by those skilled in the art. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

BFD services 248 (optional) contain computer executable instructions executed by processor 220 to verify connectivity between two systems/devices, depending on the transmission of BFD control packets ("BFD messages") between the two devices. Assume, for example, that router PE1 (a monitoring node) wishes to verify its connectivity to router P1 (a monitored node) using BFD. PE1 may transmit a BFD message to P1, and PE1 verifies connectivity based on a response/non-response from P1, e.g., within a particular time period. If PE1 does not receive a response from P1 within the time period, PE1 determines that the BFD session has failed or "timed out" (or is "down"), accordingly.

TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. TED 246 is illustratively resident in memory 240 and used to store TE information provided by the routing protocols, such as IGP, RSVP, and/or BGP (with TE extensions, e.g., as described herein), including, inter alia, TE topology as described herein. The TED 246 is illustratively maintained and managed by TE services 244.

Changes in the network topology may be communicated among routers 200 using a link-state protocol, such as the conventional OSPF and IS-IS protocols. Suppose, for example, that a communication link fails or a cost value associated with a network node changes. Once the change in the network's state is detected by one of the routers, that router may flood an IGP Advertisement communicating the change to the other routers in the network. In this manner, each of the routers eventually "converges" to an identical view of the network topology.

Figure 3:
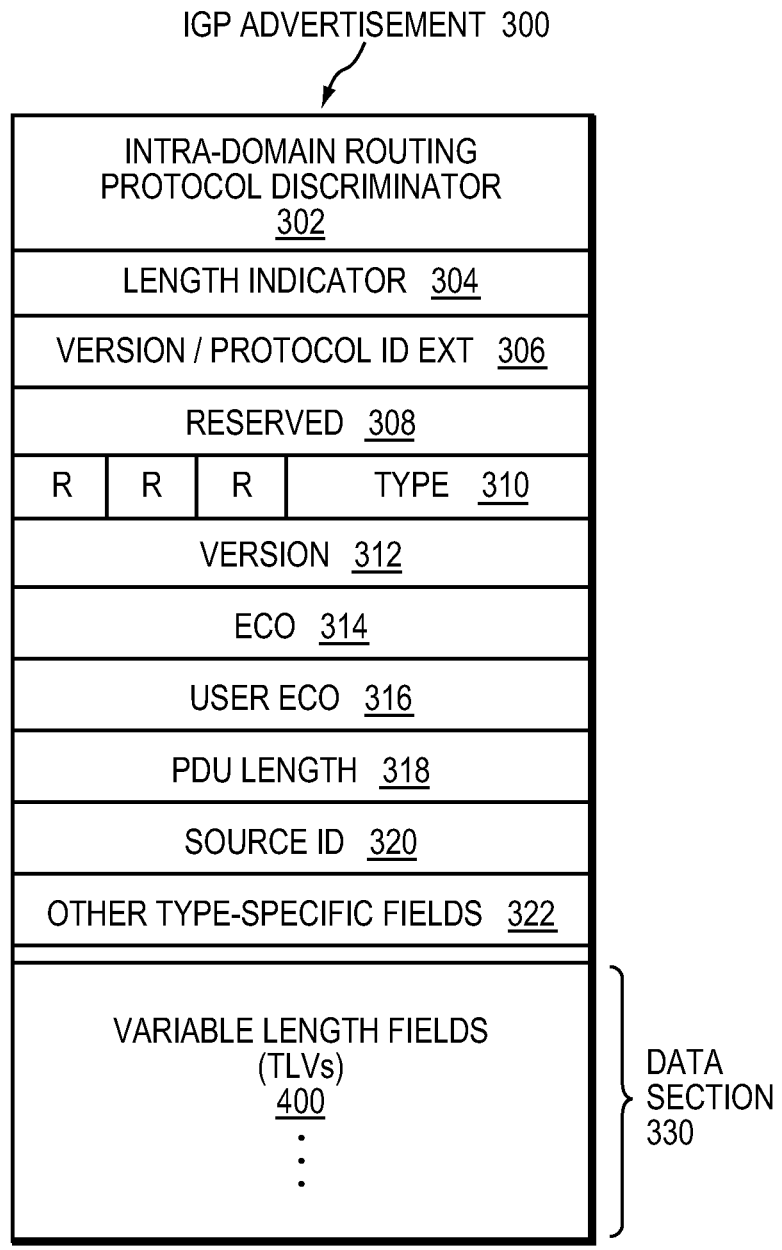
FIG. 3 is schematic block diagram of an exemplary IGP Advertisement that may be advantageously used with the present invention.

FIG. 3 illustrates an exemplary IGP Advertisement 300 that may be advantageously used by the routers 200, (e.g., an IS-IS Link State Packet). Those skilled in the art will understand that other IGP protocol messages, e.g., OSPF, may also be used in accordance with the present invention. The packet includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are ignored by the receiving router until directed for decoding in future versions of the protocol.

A type field 310 (and corresponding version field 312) stores a value indicating the type (and version) of IGP Advertisement 300 being transmitted, which may define other type-specific fields 322 that may be located within the advertisement. For example, the type of advertisement may be a "Hello" packet, or an "LSP" packet, as will be understood by those skilled in the art. The PDU length field 318 stores a value indicating the length of the entire PDU (Protocol Data Unit, or IGP Advertisement 300), including the header, type-specific fields, and data fields. A source ID field 320 stores a value that identifies the router that generated and originally broadcast the IGP Advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the IGP Advertisement. Typically, the sequence number stored in the field is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number. A remaining lifetime field (not shown) may also be used to store a value that may be used for determining whether the IGP Advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the IGP Advertisement has become invalid. That is, every router 200 that stores or floods the IGP Advertisement 300 continuously ages the packet until the remaining lifetime value equals zero. Those skilled in the art will appreciate that other aging mechanisms may alternatively be used, such as incrementing the IGP Advertisement remaining lifetime value from an initial value, e.g., equal to zero, until the remaining lifetime value reaches a known upper limit.

The data section 330 includes one or more variable length fields 400, each having a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP Advertisement 300, such as checksum values, padding fields, proprietary fields, reachability information fields, etc., and/or one or more TE information fields (e.g., as described further below). Generally, the received IGP Advertisements are stored in a Link-State Database (LSDB) of the router 200 (not shown).

The TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
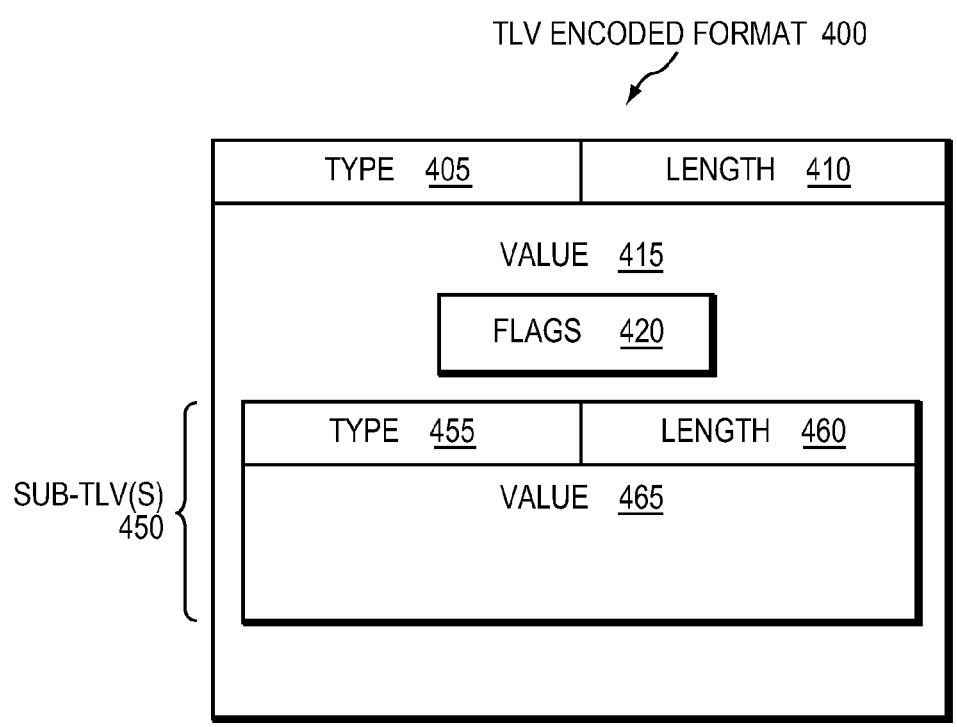
FIG. 4 is a schematic block diagram illustrating the TLV encoded format that may be advantageously used with the present invention.

FIG. 4 is a schematic block diagram illustrating the TLV encoded format 400 that may be advantageously used with the present invention. The TLV 400 may be used for a variable length field contained in an IGP Advertisement 300 above, or other protocol messages (e.g., as described below). The TLV 400 is organized to include a Type field 405 containing a predetermined type value (e.g., as defined in above-referenced RFC 3784), and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the present invention.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress, a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. An example TE-LSP is shown as the lines and arrows (T1) between a head-end node (P1) and a tail-end node (P4) in FIG. 1. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs, the path computation request (and response) between PCC and PCE can be exchanged in accordance with a protocol specified in Vasseur, et al., *Path Computation Element (PCE) Communication Protocol (PCEP)—Version 1—<draft-ietf-pce-pcep-00.txt>*, Internet Draft, November 2005, the contents of which are hereby incorporated by reference in its entirety. It should be understood that the use of RSVP or PCEP serves only as an example, and that other communication protocols may be used in accordance with the present invention.

In accordance with RSVP, to request a data flow (TE-LSP) between a sender (e.g., head-end node P1) and a receiver (e.g., tail-end node P4), the sender may send an RSVP path request (Path) message downstream to the receiver along a path (e.g., a unicast route) to identify the sender and indicate e.g., bandwidth needed to accommodate the data flow, along with other attributes of the TE-LSP. The Path message may contain various information about the data flow including, e.g., traffic characteristics of the data flow. Also in accordance with the RSVP, a receiver establishes the TE-LSP between the sender and receiver by responding to the sender's Path message with a reservation request (Resv) message. The reservation request message travels upstream hop-by-hop along the flow from the receiver to the sender. The reservation request message contains information that is used by intermediate nodes along the flow to reserve resources for the data flow between the sender and the receiver, to confirm the attributes of the TE-LSP, and provide a TE-LSP label. If an intermediate node in the path between the sender and receiver acquires a Path message or Resv message for a new or established reservation (TE-LSP) and encounters an error (e.g., insufficient resources, failed network element, etc.), the intermediate node generates and forwards a path or reservation error (PathErr or ResvErr, hereinafter Error) message to the sender or receiver, respectively. Notably, as used herein, signaling messages such as a Path message, Resv message, and/or Error message may be referred to as "state control blocks."

Figure 5:
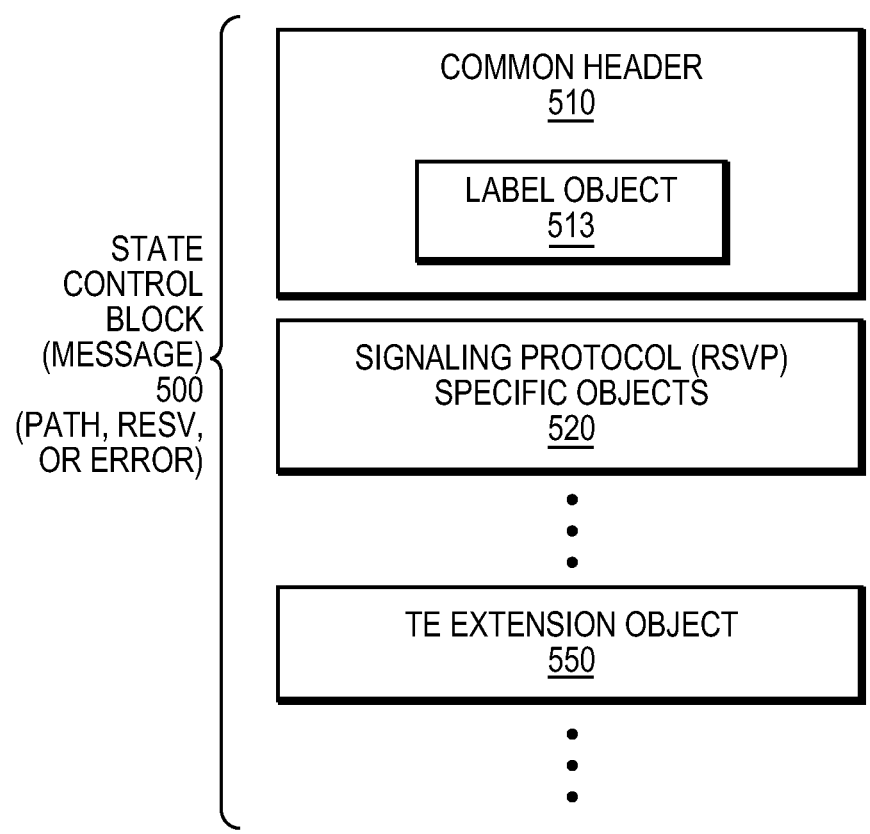
FIG. 5 is a schematic block diagram of portions of a state control block that may be advantageously used with the present invention.

FIG. 5 is a schematic block diagram of portions of a state control block (message) 500 (e.g., an RSVP message, such as Path, Resv or Error) that may be advantageously used with the present invention. Message 500 contains, inter alia, a common header 510, one or more signaling protocol specific objects 520, as well as a "TE Extension Object" 550, described below. The common header 510 may comprise, in addition to a source and destination address of the message 500, a label object 513 denoting the label-switched label to use when forwarding the message 500, as described below. Protocol specific objects 520 contain objects necessary for each type of message 500 (e.g., Path, Resv, Error, etc.). For instance, a Path message may have a sender template object, Tspec object, Previous-hop object, LSP-Attribute object, etc. Various flags and/or TLV encoding formats (not shown) may also be contained within the specific objects 520, as will be understood by those skilled in the art. A Resv message, on the other hand, may have specific objects 520 for a label object, session object, filter spec object, etc. Also, Error messages 500 (e.g., PathErr or ResvErr), may also have specific objects 520, such as for defining the type of error, etc.

It should be noted that in accordance with RSVP signaling, the state of the RSVP is refreshed on a timed interval, e.g., every thirty seconds, in which RSVP Path and Resv messages (state control blocks) are exchanged. This timed interval is configurable by a system administrator. In the event a node along the RSVP path (e.g., a TE-LSP) does not receive a state control block in the timed interval, the state "times out," and the path is no longer maintained by that node. Those skilled in the art will understand that RSVP is merely an example, and that other tunneling protocols may be used in accordance with the present invention.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To obviate delays associated with updating routing tables when attempting to avoid a failed network element (i.e., during convergence), some networks have employed MPLS TE fast reroute (FRR). MPLS FRR is a technique that may be used to quickly reroute traffic around failed network elements in a TE-LSP. MPLS FRR is further described, for example, by Fast Reroute Extensions to RSVP-TE for LSP Tunnels, as incorporated by reference above. According to the technique, one or more network elements (e.g. links or nodes) in a network are protected by backup tunnels following an alternate path. If a failure occurs on a protected link or node, TE-LSPs (and consequently the traffic that they carry) are locally rerouted onto an appropriate alternate path (e.g., a "backup tunnel") by the node immediately upstream from the failure. The backup tunnel acts as an FRR path for the primary TE-LSP and obviates delays associated with other measures, such as tearing down the primary TE-LSP after having gracefully rerouted the TE-LSPs affected by the failure, should an alternate path around the failed network element exist. In the event of a failure of a protected element the head-end node of the backup tunnel (or a "point of local repair," PLR) may quickly begin routing traffic over the backup tunnel with minimal disruption to traffic flow. Those skilled in the art will understand that MPLS FRR is one example of link or node failure protection, and that other known correction mechanisms may be used in accordance with the present invention. As mentioned above, however, in order for failure protection to function properly within a TE-LSP, the backup tunnel must intersect (i.e., begin and end within) the protected primary TE-LSP, which means the head-end node of the primary TE-LSP may not be protected in the conventional manner.

Referring again to FIG. 1, assume that each provider router (P node) has a TE-LSP established to each and every other P node of the computer network 100, i.e., a P-to-P full mesh of TE-LSPs. For clarity, two TE-LSPs (i.e., primary TE-LSPs) are shown from head-end node P1. A first TE-LSP, T1, traverses the core of the network to P4 for address prefixes IP3 and IP4, and a second TE-LSP, T2, to P5 for IP5. Accordingly, the links between the PE nodes and P nodes may be IP based, as will be understood by those skilled in the art, such as, e.g., label-switched packets (e.g., according to the Label Distribution Protocol, LDP). Once IP traffic from the PE nodes reaches the P nodes, the P nodes may encapsulate the traffic onto a corresponding primary TE-LSP destined for a tail-end P node, ultimately reaching a PE node coupled to one or more address prefixes.

The present invention is directed to a technique for dynamically protecting against failure of a head-end node of one or more primary TE-LSPs in a computer network. According to the novel technique, a neighboring upstream node ("protecting node") of the head-end node learns of the primary TE-LSPs (and their respective state control blocks) extending from the head-end node to one or more address prefixes. The protecting node establishes a repair TE-LSP for each of the primary TE-LSPs to a corresponding downstream neighboring node of the head-end node (a "next-next-hop"). In response to detecting a failure of the head-end node, the protecting node locally reroutes traffic destined for the address prefixes to an appropriate repair TE-LSP. Due to the failure of the head-end node, the protecting node then refreshes the states of the primary TE-LSPs using replicated state control blocks accordingly, until the repair TE-LSPs are no longer needed.

In accordance with one aspect of the present invention, the head-end node (e.g., P1) may request failure protection from one or more neighboring protecting nodes. Illustratively, the head-end node may advertise that it is a head-end node, and that it requests protection against failure, using one or more flags 420 within the IGP Advertisement 300. For example, a router capability TLV 400 carried within an IS-IS Advertisement 300 may contain the novel flags field 420. Alternatively, the flags 420 may be embodied within an OSPF router information Link State Advertisement (LSA), as will be understood by those skilled in the art. Those skilled in the art will also understand that other IS-IS TLVs 400 (e.g., a TE Extension TLV), or other OSPF LSAs (e.g., Opaque LSAs, described below) may be used to convey the request for protection from the head-end node to the neighboring protecting nodes, and that flags 420 are merely exemplary.

Illustratively, the protecting node may learn of the primary TE-LSPs to one or more address prefixes for which the head-end node requests protection, along with their respective state control blocks, through the use of local Interior Gateway Protocol (IGP) messages or through the use of a "fake" unconstrained TE-LSP to the head-end node. Each protecting node, therefore, may dynamically retrieve (discover) primary TE-LSP information necessary to protect the head-end node in accordance with the present invention. This information generally comprises, e.g., a list of protected primary TE-LSPs, destination address prefixes (e.g., IPv4 addresses) and their association to the protected TE-LSPs, and a state control block 500 used by the head-end node (P1) to refresh the state of each of the primary TE-LSPs. The state control block 500 may contain a next-hop address for each primary TE-LSP from the head-end node (i.e., the next-next-hop of the TE-LSP from the neighboring protecting node), such as, e.g., in a route record object (RRO) as will be understood by those skilled in the art. For example, the next-hop for TE-LSP T1 from the head-end node P1 is P3, while the next-hop for TE-LSP T2 is P2. If the state control block 500 does not contain the next-hop address, however, the next-hop address must be included separately within the necessary primary TE-LSP information.

Notably, the head-end node may request protection of only a subset of reachable address prefixes of interest. For instance, various access control lists (ACLs), VPN associations, etc., may be used to distinguish for which address prefixes the head-end node requests protection. For example, the head-end node (P1) may request protection of TE-LSPs for reaching loopback addresses of one or more PE nodes of the computer network 100, e.g., PE3, PE4, and PES, in accordance with the present invention, and not for other address prefixes.

Figure 6:
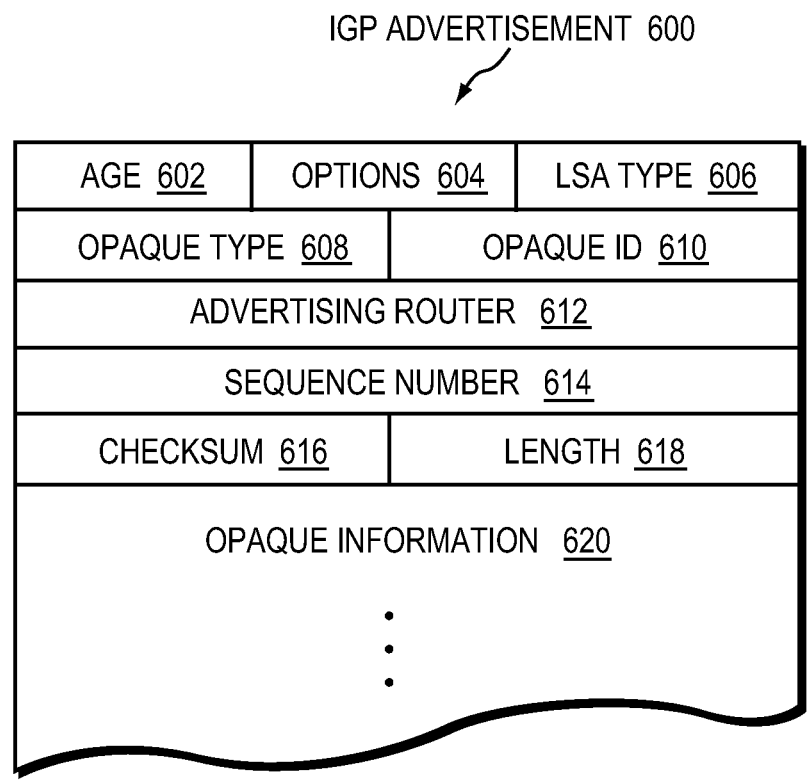
FIG. 6 is a schematic block diagram of an exemplary IGP Advertisement that may be advantageously used with the present invention.

In one illustrative embodiment, the protected head-end node (P1) may employ an IGP, such as the OSPF or IS-IS protocol, to transmit the necessary primary TE-LSP information. Notably, a specific type of IGP advertisement may be used to limit the transmission of the information to only neighbors of the head-end node (e.g., PE1, PE2, P2, P3, and P4). FIG. 6 illustrates an exemplary IGP Advertisement 600 that may be transmitted (flooded) by the router 200 (e.g., the protected head-end node). Illustratively, the IGP Advertisement 600 is embodied as a Type-9 Opaque LSA, defined in RFC 2370, entitled *The OSPF Opaque LSA Option*, dated July 1998, the contents of which are hereby incorporated by reference in its entirety. An Age field 602 stores an age value that may be used for determining whether the IGP Advertisement 600 is valid, similar to the remaining lifetime field of IGP Advertisement 300 above.

The advertisement 600 also includes an Options field 604, and an LSA Type field 606 denoting whether the LSA is a Type-9, Type-10, or Type-11 LSA. A Type-11 LSA has AS-wide scope, meaning it is flooded throughout an entire AS, while a Type-10 LSA has area-wide scope, which would not be flooded beyond that area into which the LSA was flooded. A Type-9 LSA, on the other hand, has a link-local scope, which is not flooded beyond the local (sub)network, i.e., only to the adjacent next-hop routers (neighbors). While the present invention illustratively utilizes a Type-9 LSA to limit unnecessary network traffic, those skilled in the art will understand that other LSA Types may be used within the scope of the present invention.

Also included within the IGP Advertisement 600 is an Opaque Type field 608 and an Opaque ID field 610, which signify the type and ID of the Opaque LSA. An Advertising Router field 612 stores a value that identifies the router that generated and originally broadcast the IGP Advertisement 600. A Sequence Number field 614 stores a sequence number indicating the relative version of the IGP Advertisement 600, similar to the sequence number of IGP Advertisement 600 above.

The IGP Advertisement 600 also includes a Checksum field 616 containing a checksum used to validate the contents of the Advertisement, and a Length field 618 containing a value used to signify either the overall length of the Advertisement or the length of an Opaque Information field 620. The Opaque Information field 620, by definition, is used by the advertising node for transmitting any desired information. According to the invention, the Opaque Information field illustratively includes information of the primary TE-LSPs to one or more address prefixes for which the head-end node requests protection, along with their respective state control blocks. Using FIG. 1 as an example, the Opaque Information field populated by, e.g., protected head-end node P1, contains the primary TE-LSP information for primary TE-LSP T1 to address prefixes IP3 and IP4 (with next-hop P3), and for T2 to IP5 (with next-hop P2), including a corresponding state control block 500 used by the head-end node for each primary TE-LSP.

Alternatively, the IGP Advertisement 600 may be in the form of an IS-IS Link State Packet (e.g., IGP Advertisement 300 described in FIG. 3 above), which may include TLV encoded formats to convey information. In the alternative embodiment, the IS-IS Packet may include a TE Extended Object illustratively embodied as a TLV. The Value field of the TE Extended Object may contain, inter alia, the necessary primary TE-LSP information, as mentioned above. Notably, however, an IS-IS Link State Packet is generally not limited in scope and is flooded throughout an entire IS-IS level, in which case the non-neighboring routers would be configured to ignore the information.

Figure 7:
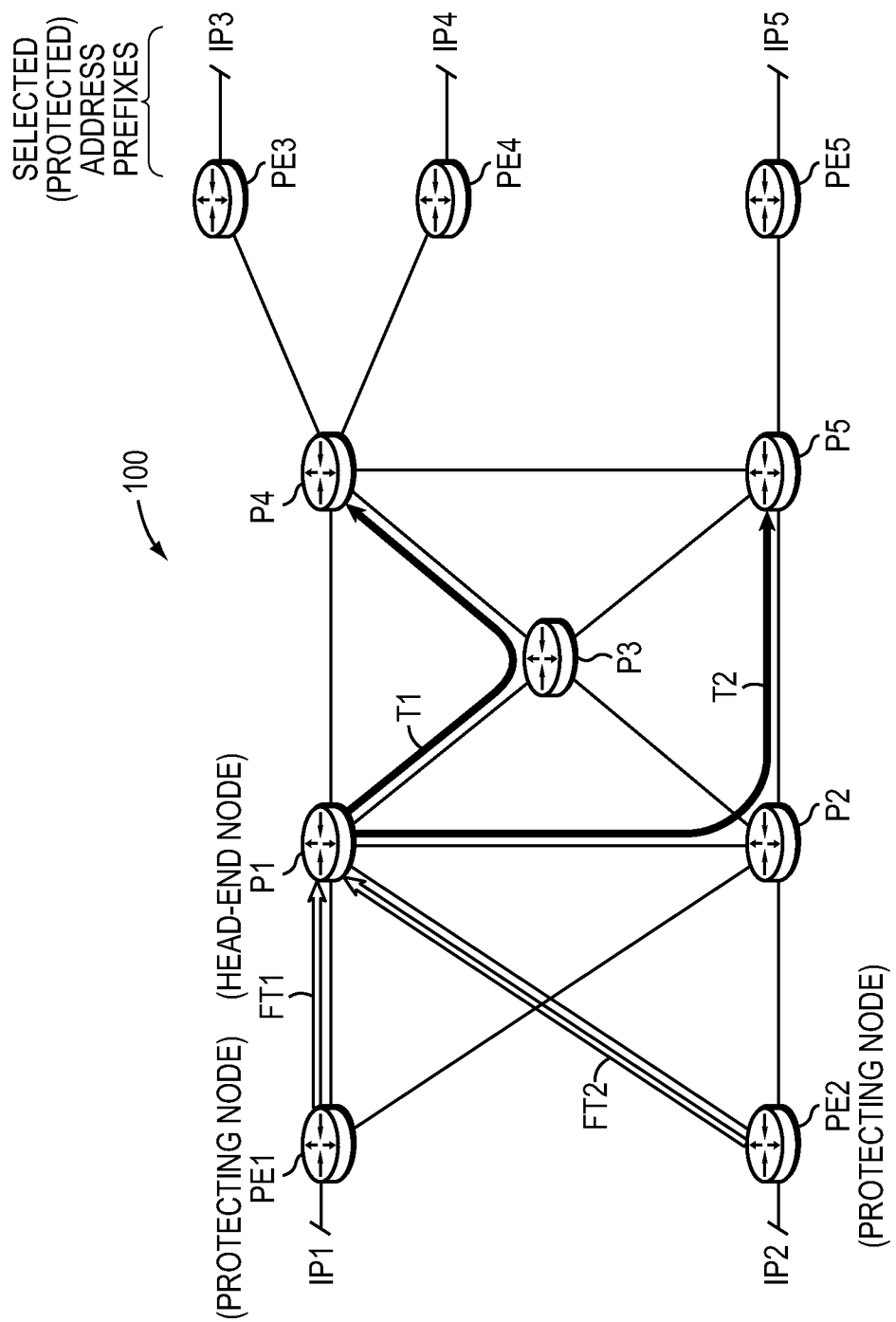
FIG. 7 is a schematic block diagram of the computer network in FIG. 1 showing exemplary fake tunnels in accordance with the present invention.

In an alternative illustrative embodiment of the present invention, the protecting nodes (PE1 and PE2) may employ one or more tunnels (TE-LSPs) to the head-end node (e.g., unconstrained one-hop tunnels) to obtain the necessary primary TE-LSP information in response to receiving the protection request from the head-end node (P1). Because these tunnels are used only to retrieve necessary primary TE-LSP information, they may be configured as "fake" TE-LSPs, meaning they reserve no bandwidth and/or transmit no other traffic. FIG. 7 is a schematic block diagram of the computer network 100 in FIG. 1 showing exemplary fake tunnels (outlined lines and arrows FT1 and FT2) from the protecting nodes (PE1 and PE2, respectively) to the head-end node (P1) in accordance with the present invention.

An example of a dynamic information discovery technique using tunnels is described in U.S. Application Ser. No. (Atty. Docket No. 112025-0600), entitled PROPAGATION OF ROUTING INFORMATION IN RSVP-TE FOR INTER-DOMAIN TE-LSPS, filed by Vasseur et al. on Dec. 1, 2004, the contents of which are hereby incorporated in its entirety. The dynamic methods described therein include the use of extensions to RSVP messages (e.g., TE Extension Object 550 of state control block 500) to transmit the desired information. For example, in accordance with the present invention, a request object (e.g., in TE Extension Object 550) is sent from the protecting node (PE1) to the head-end node (P1) along a fake TE-LSP (FT1) to request the primary TE-LSP information, to which the head-end node responds (e.g., with a response object in TE Extension Object 550). Illustratively, the primary TE-LSP information in the response includes the one or more primary TE-LSPs to one or more address prefixes for which the head-end node requests protection, along with their respective state control blocks, as described above.

Once the necessary information is obtained, the protecting node establishes a repair TE-LSP for each of the primary TE-LSPs to a corresponding next-next-hop, and associates the address prefixes of interest with the repair TE-LSPs. Using the necessary primary TE-LSP information, the protecting node (e.g., PE1) calculates and creates repair tunnels (e.g., TE-LSPs) to the next-next-hops that are diversely routed around the protected head-end node (e.g., by traversing another node or nodes between the protecting node and the next-next-hops). To ensure that the tunnels are diversely routed from the protected head-end node (P1), network element exclusion or PCE-based path computation can be used. In FIG. 1, a diverse repair TE-LSP (RT1) to next-next-hop P3 for primary TE-LSP T1 manifests as traversing P2. It should be noted that any other node or router (not shown) that is separate (diverse) from the protected tail-end node may be used.

Figure 8:
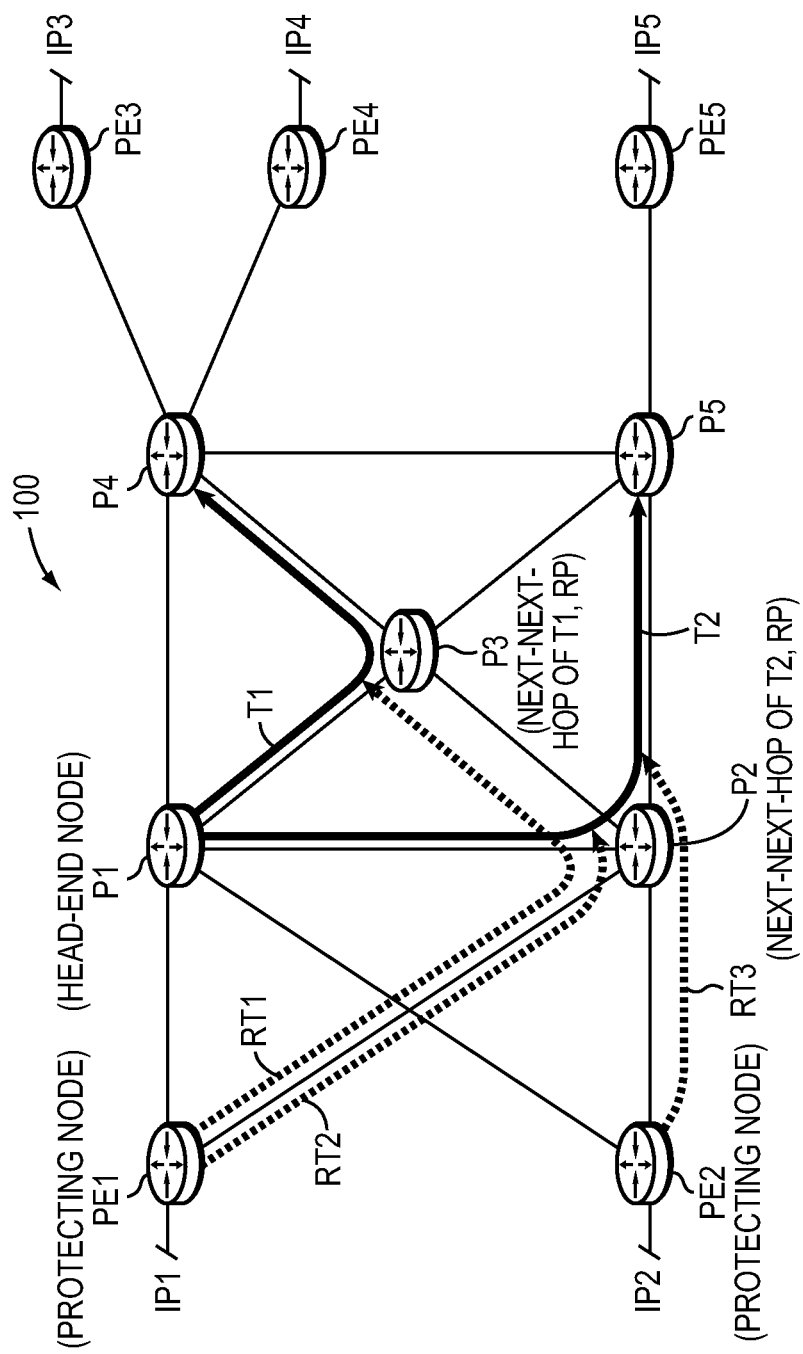
FIG. 8 is a schematic block diagram of the computer network in FIG. 1 showing exemplary repair TE-LSPs in accordance with the present invention.

FIG. 8 is a schematic block diagram of an exemplary computer network 100 as in FIG. 1 with illustrative repair TE-LSPs (shown as dotted lines and arrows) in accordance with the present invention. Notably, the repair TE-LSPs are created according to the methods described above. For example, RT1 is a repair TE-LSP for primary TE-LSP T1 from the protecting node PE1 through P2 (diverse router) to next-next-hop P3 (i.e., the remerge point, RP). In addition, RT2 is a repair TE-LSP for primary TE-LSP T2 from the protecting node PE1 to next-next-hop P2. As an additional example, a repair TE-LSP RT3 for primary TE-LSP T2 from a different protecting node PE1 may also be established to next-next-hop P2.

Figure 9:
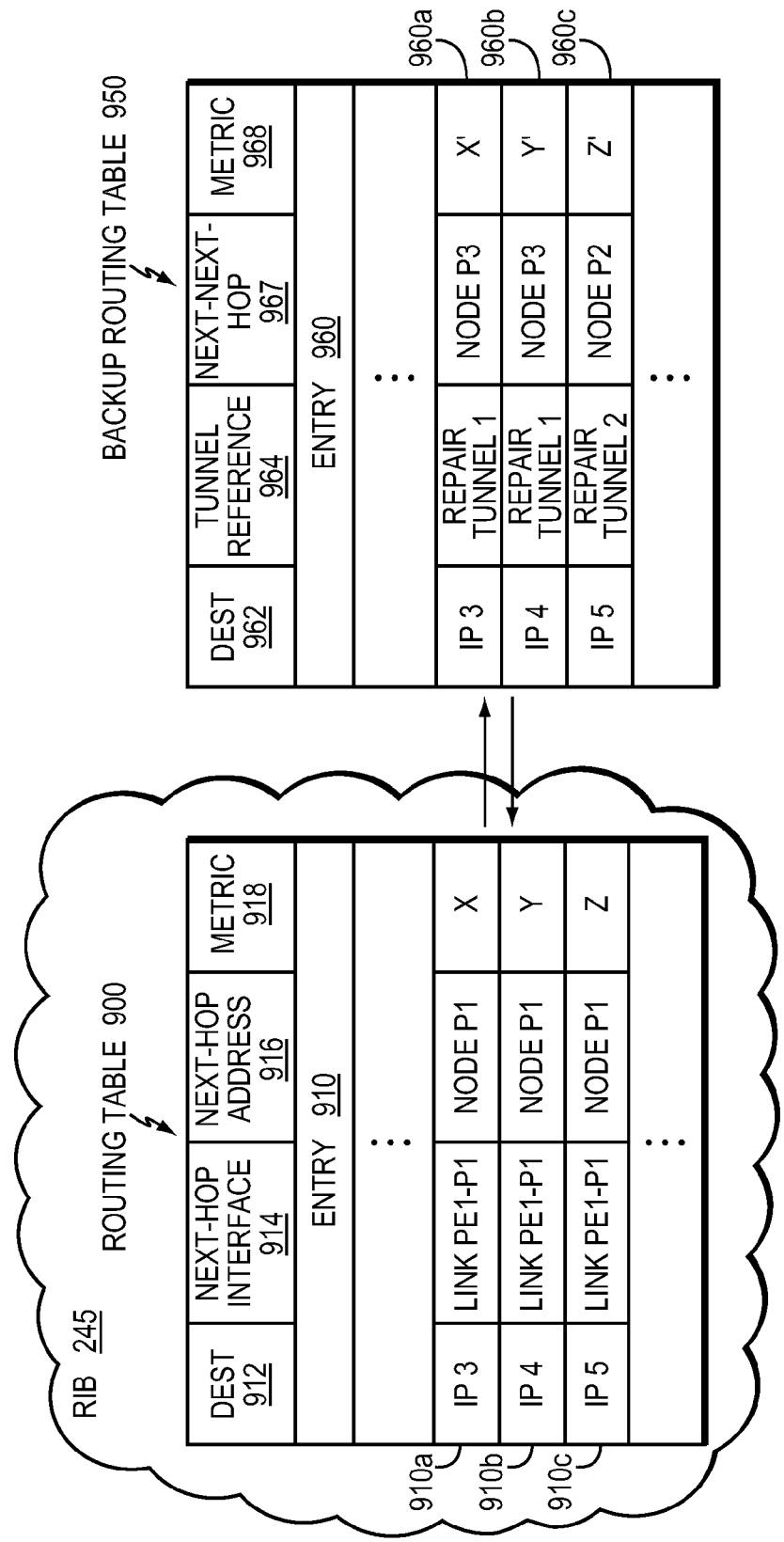
FIG. 9 is schematic block diagram of exemplary routing table that may be advantageously used with the present invention.

These repair TE-LSPs and appropriate next-next-hops may be illustratively stored in a backup routing table (BRT) of the protecting node that is maintained current in the event of protected head-end node failure. The use of a BRT allows the protecting node to perform conventional routing (e.g., IP routing to P1) using its routing table. FIG. 9 is schematic block diagram of exemplary routing table 900 that may be advantageously used with the present invention. Routing table 900 is illustratively stored in memory 240 and includes one or more entries 910, each comprising a plurality of fields for storing a reachable destination address 912, a next-hop interface 914 and next-hop address 916 to reach that destination, and an associated metric (e.g., cost) 918 of reaching the destination. The routing table 900 is illustratively maintained and managed by RIB 245. To that end, the RIB 245 maintains copies of routes (paths) provided by the routing protocols, such as IGP, in order to compute best paths/routes for installation into the routing table 900.

For example, assume that destination address prefix IP3 is reachable from PE1 via P1. A destination address field 912 of entry 910a contains the reachable address IP3, and the next-hop fields 914, 916, are populated with, e.g., link PE1-P1 and a loopback address of node P1, respectively. Note that a loopback address of the next hop node is used as the next-hop address for many reasons, including as a way to avoid depending upon the availability of network interfaces of that node. The metric or cost to reach IP3 is the cost of all links to the reachable address, denoted as "X." Further assume that destination address prefixes IP4 and IP5 are reachable from PE1 again via P1. Destination address fields 912 of entries 910b and 910c (respectively) contain the reachable addresses IP4 and IP5, and the next-hop fields 914, 916, are populated with the same information as above, and the costs to reach IP4 and IP5 are denoted as "Y" and "Z."

Associated with the routing table 900 is backup routing table (BRT) 950. As noted, the BRT 950 illustratively stores protection information (i.e., repair TE-LSP information for the primary TE-LSPs of the protected head-end node), to enable conventional routing operations at the protecting node (e.g., PE1). The fields of the BRT 950 are populated by the repair TE-LSPs calculated in response to the information obtained from the necessary primary TE-LSP information as described above. The BRT 950 essentially comprises the same format as routing table 900, but with destination address prefixes reachable via the repair TE-LSPs to the next-next-hops. Specifically, each entry 960 of the BRT 950 may include a plurality of fields for storing one or more destination prefixes 962 reachable from the primary TE-LSPs, a reference to a repair tunnel (TE-LSP) 964 to the next-next-hop (RP) (i.e., to the primary TE-LSP), the address of the next-next-hop (RP) 967, and (optionally) a cost metric 968, e.g., X', Y', and Z'. The Tunnel Reference field 964 contains the appropriate repair TE-LSP identifiers (and possibly the appropriate label) corresponding to the protected address prefixes. Notably, the cost may or may not be known by the protecting node (e.g., in interdomain situations), in which case such cost would not be present in the BRT 950. Moreover, the BRT 950 may be configured as a single table for all repair TE-LSPs, or may instead be a table for each repair TE-LSP. Also note that an indication (e.g., a flag or value) may be used to notify the protecting node which routing table to use, such as, e.g., an indication as to whether the routing is in a steady-state or repair (FRR) situation, as described herein. Prior to any change in the state of P1 (e.g., prior to failure), conventional routing (e.g., using label-switched or IP routing) is employed by the protecting nodes. The repair TE-LSPs stored in BRT 950 are "dormant" (unused) until needed, as described below. Also, the BRT may be updated upon receiving a refresh message from the head-end node requesting protection (for example, if different TE-LSPs are to be protected).

Figure 10:
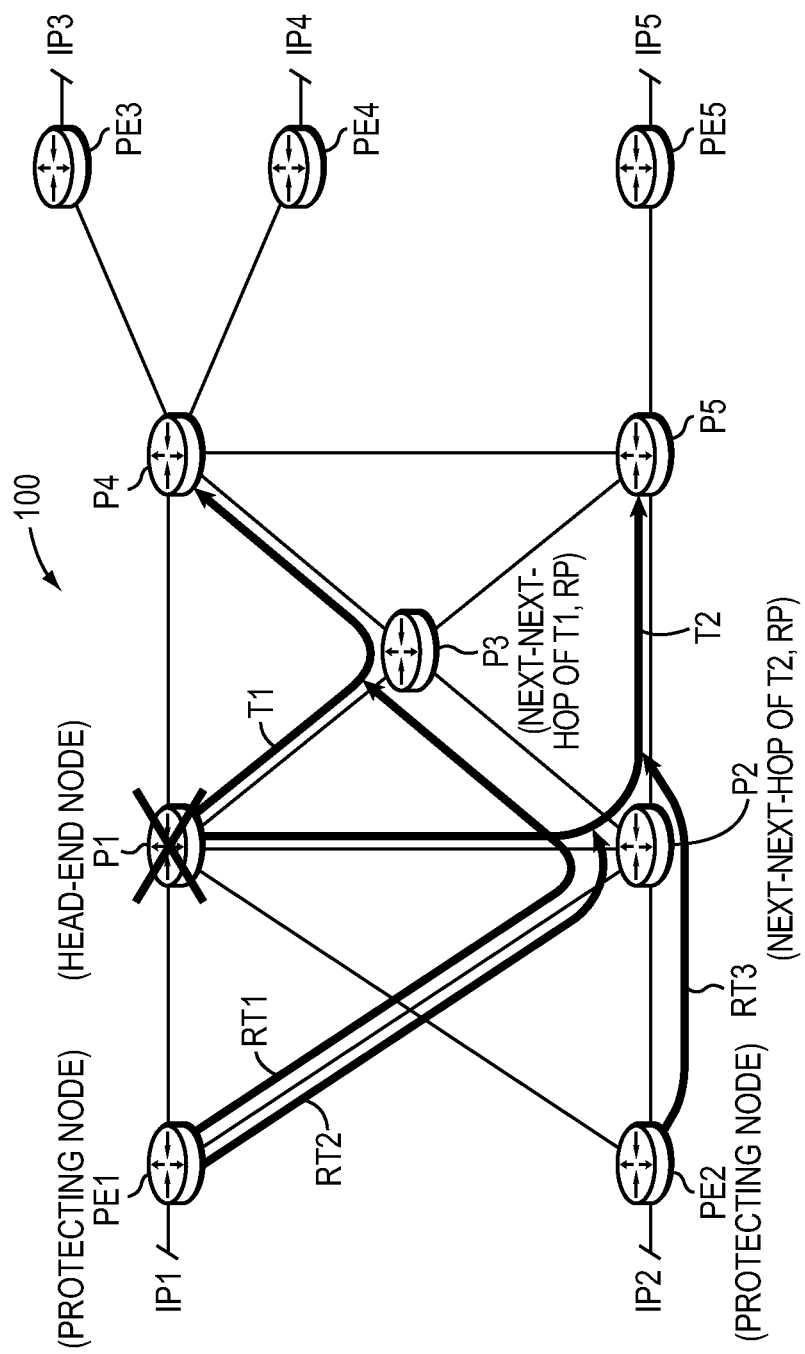
FIG. 10 is a schematic block diagram of the computer network in FIG. 8 showing protection of a head-end node using repair TE-LSPs in accordance with the present invention.

In accordance with another aspect of the present invention, the protecting node detects head-end node failure (e.g., as denoted by an "X" overlaid on P1 in FIG. 10) and begins to locally reroute (e.g., FRR) traffic of the protected address prefixes onto corresponding repair TE-LSPs (e.g., according to the BRT 950). The protecting node may detect a failure of the protected head-end node through any known link or node failure detection technique, such as layer 2 failure detection and/or any keep-alive protocol (e.g., IGP or BFD). Other MPLS TE-LSP failure detection techniques may also be used, such as state refreshing, etc., e.g., on the fake TE-LSPs established above.

According to the invention, once local rerouting (FRR) has been triggered, the protecting node determines whether incoming traffic originally would have traversed the failed head-end node to the protected prefixes. Upon receiving the traffic, the protecting node uses the BRT 950 for the traffic in response to a flag, a pointer, or other indicating means, indicating that the protecting node should route in accordance with the repair situation. Traffic that was originally bound for the protected head-end node (e.g., IP3, IP4, and/or IP5), is rerouted onto the corresponding repair TE-LSPs in the respective table entry 960, such as in repair tunnel reference field 964 (repair tunnel 1 or 2) to the appropriate next-next-hops (P2 or P3).

Illustratively, a traffic packet destined for a prefix previously reachable via the failed head-end node is encapsulated by the protecting node (e.g., PE1) into a repair TE-LSP packet (a tunnel label is appended or "pushed" onto the packet), which is rerouted onto the repair TE-LSP corresponding to the tunnel label (e.g., RT1). Once the repair TE-LSP next-next-hop remerge point (e.g., P3) receives the tunnel packet, it removes ("pops") the tunnel label corresponding to the repair TE-LSP, and routes the traffic packet according to the primary TE-LSP tunnel labels (e.g., T1). In other words, by pushing the tunnel label that the remerge point expects to receive from the protected head-end node, tunnel traffic from the protecting node "appears" to have originated at the head-end node, and is routed along the original primary TE-LSPs accordingly. The traffic on the repair TE-LSPs joins the primary TE-LSP at the next-next-hop (remerge point, RP), and continues to the address prefixes along the primary TE-LSPs. Those skilled in the art will understand that, alternatively, a penultimate hop along the repair TE-LSP (one hop prior to the remerge point) may remove the tunnel label corresponding to the repair TE-LSP prior to forwarding traffic to the remerge point (i.e., "penultimate hop popping").

In order to refresh the states of the primary TE-LSPs in the absence of a head-end node (i.e., preventing refresh state timeout), the protecting node sends replica state control blocks 500 (e.g., Path messages) to the RP, which forwards the state control blocks along the primary TE-LSP according to an appropriate label. The label (e.g., in label object 513 of the message 500) may be used to label-switch the state control block 500 along the repair TE-LSP to the remerge point. In this manner, an identical state control block 500 as would have been sent from the head-end node (i.e., same source and destination addresses) may be sent to the remerge point as though arriving from the failed head-end node. Label-switching also prevents possible intermediate nodes along the repair TE-LSP (not shown) from storing information (e.g., "creating a state") for the primary TE-LSP, as will be understood by those skilled in the art. Those intermediate nodes would simply route the state control block 500 as any conventional tunnel traffic, performing label switching accordingly.

The state of the primary TE-LSPs may be refreshed until they are no longer needed, e.g., when the network reconverges or the head-end node (and the primary TE-LSPs) are restored, and the traffic may be routed according to the reconverged routes.

Notably, because multiple upstream protecting nodes (e.g., PE1 and PE2) may exist for the same primary TE-LSPs (e.g., T2), the RP (P2) is configured to expect identical state control blocks 500 from different sources. The RP may either send each received state control block, or may instead collect the received state control blocks, and only send one to the nodes of the primary TE-LSP. In return, the RP also sends returned state control blocks 500, e.g., Resv messages, to each upstream protecting node (e.g., PE1 and PE2). Generally, the number of upstream protecting nodes is limited (e.g., usually less than ten), so the number of identical state control block messages 500 is also limited. As those skilled in the art will understand, having multiple protecting nodes utilizing the same RP for the same primary TE-LSP effectively creates a multipoint-to-point TE-LSP from the protecting nodes to the tail-end node of the primary TE-LSP, merging at the remerge point.

Figure 11:
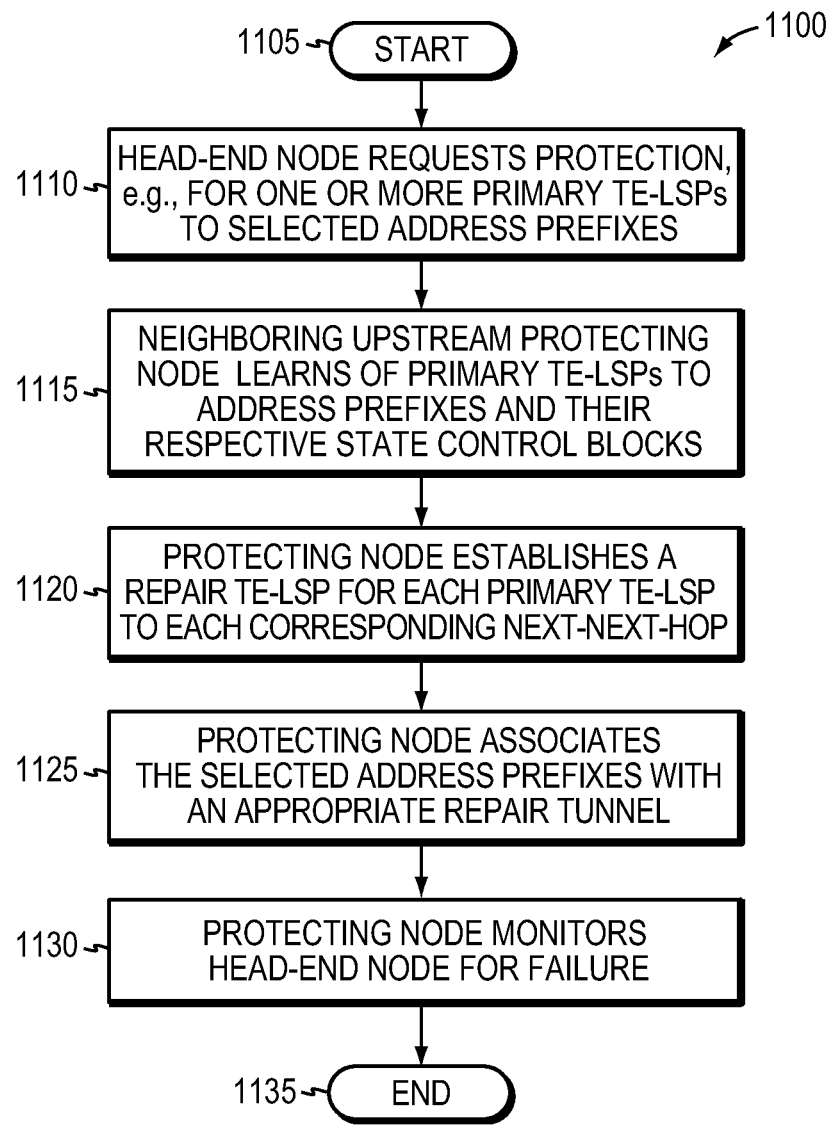
FIG. 11 is a flowchart illustrating a procedure for preparing to protect a head-end node in accordance with the present invention.
Figure 12:
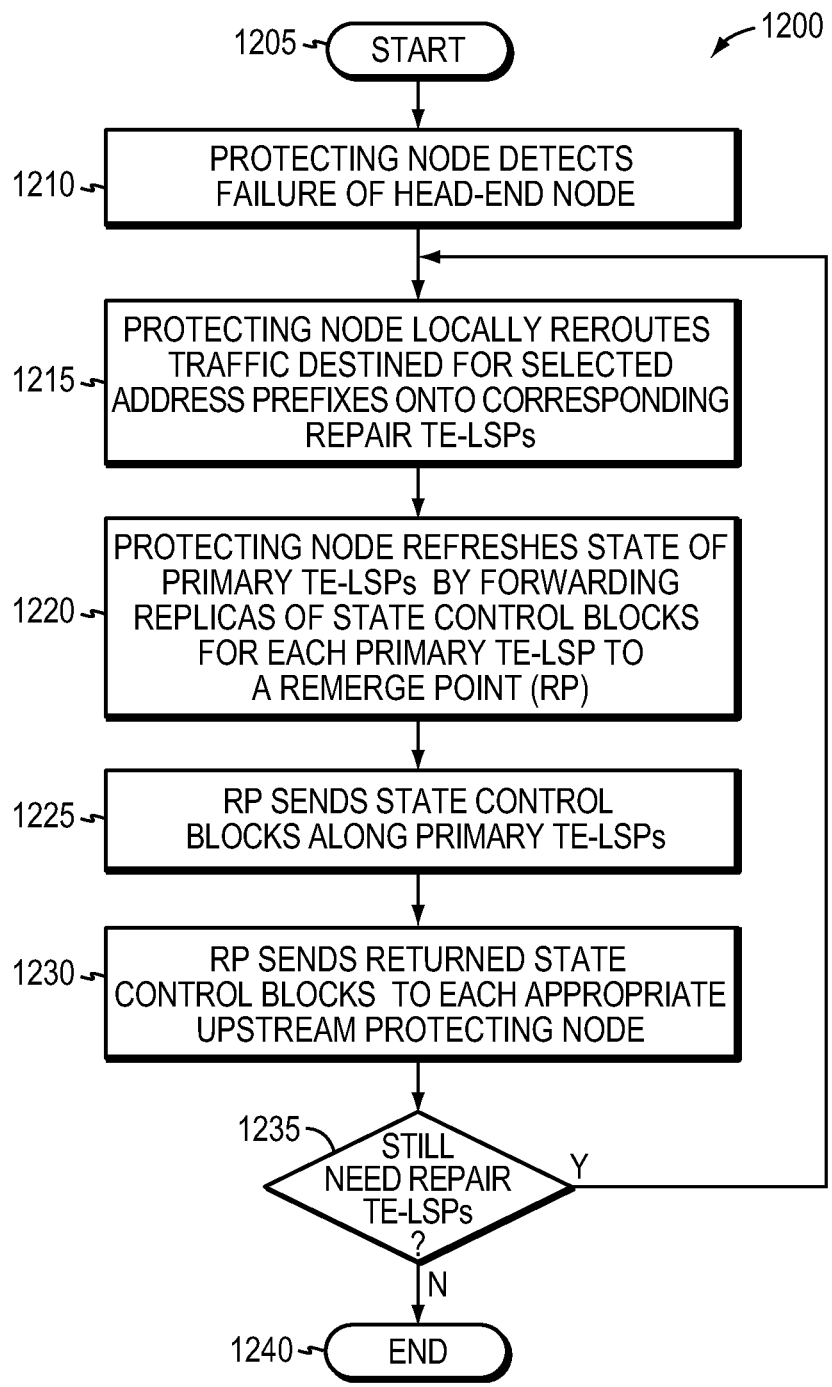
FIG. 12 is a flowchart illustrating a procedure for responding to failure of the head-end node in accordance with the present invention.

FIGS. 11 and 12 are flowcharts illustrating procedures for dynamically protecting against failure of a head-end node of one or more primary TE-LSPs in accordance with the present invention. FIG. 11 is a flowchart illustrating a procedure for preparing to protect the head-end node in accordance with the present invention. The procedure 1100 starts at step 1105, and continues to step 1110, where the head-end node (e.g., P1) requests protection as described above, e.g., for one or more primary TE-LSPs (e.g., T1 and T2) to selected address prefixes (e.g., IP3, IP4, and IP5). A neighboring upstream protecting node (e.g., PE1 and/or PE2) receives the request, and learns of the primary TE-LSPs and their respective state control blocks (e.g., message 500) in step 1115. As mentioned above, the protecting node may learn of this information through the use of IGP messages 600 or fake TE-LSPs (FT1 or FT2) to the head-end node. At step 1120, the protecting node (e.g., PE1) establishes a repair TE-LSP for each primary TE-LSP to each corresponding next-next-hop (e.g., P2 and P3). With the repair TE-LSPs created (e.g., RT1 and RT2), the protecting node associates the selected (protected) address prefixes with an appropriate repair TE-LSP in step 1125, i.e., a repair TE-LSP to a primary TE-LSP for the particular address prefix (e.g., IP3 and IP4 with RT1, and IP5 with RT2). The protecting node monitors the head-end node for failure in step 1130 (e.g., IGP, RSVP, BFD, etc.), and the procedure 1100 ends at step 1135.

FIG. 12 is a flowchart illustrating a procedure for responding to failure of the head-end node in accordance with the present invention. The procedure 1200 starts at step 1205, and continues to step 1210, where the protecting node detects a failure of the head-end node. In response, the protecting node locally reroutes traffic destined for the selected (protected) address prefixes onto the corresponding repair TE-LSPs in step 1215. As described above, in step 1220 the protecting node refreshes the states of the primary TE-LSPs by forwarding a replica of the state control blocks 500 (e.g., RSVP Path messages) for each primary TE-LSP to an RP, i.e., the next-next-hop (e.g., P2 and P3) of the primary TE-LSPs. The RP sends the state control blocks along the primary TE-LSPs in step 1225. Any returned state control blocks 500 (e.g., RSVP Resv messages) to the RP are forwarded to each appropriate upstream protecting node (e.g., PE1 and PE2) in step 1230, as described above. If the protecting node needs to continue utilization of the repair TE-LSPs at step 1235, the procedure 1200 returns to locally reroute traffic (step 1215) and refresh the states of the primary TE-LSPs (steps 1220-1230). Otherwise, in the event the protecting node no longer needs to utilize the repair TE-LSPs (e.g., network reconvergence, head-end restored, etc.) in step 1235, the procedure 1200 ends at step 1240. Notably, because the protecting node no longer refreshes the states of the primary TE-LSPs, if the head-end node has not been restored, the primary TE-LSPs timeout accordingly (i.e., when the state is not refreshed by any protecting node). Moreover, the repair TE-LSPs, although no longer active, may be maintained by the protecting node to continue the future protection of the head-end node in the event the head-end node (and primary TE-LSPs) has been restored.

Advantageously, the novel technique dynamically protects against failure of a head-end node of one or more primary TE-LSPs in a computer network. By establishing repair TE-LSPs around the head-end node, the novel technique allows a protecting node to quickly reroute traffic onto the repair TE-LSPs to the primary TE-LSPs in the event of head-end node failure. In particular, the use of repair TE-LSPs may increase the recovery scope of P-to-P TE-LSP mesh networks, while preserving scalability as compared to PE-to-PE TE-LSP mesh networks (e.g., the total number of TE-LSPs within the computer network, as well as the number of TE-LSPs maintained at each router of the network (e.g., Ps and PEs), is diminished as compared to the full PE-to-PE mesh). Also, TE techniques may be advantageously applied to the repair TE-LSPs, as will be understood by those skilled in the art. Further, the dynamic nature of the novel technique alleviates the need for cumbersome manual configuration.

While there has been shown and described an illustrative embodiment that dynamically protects against failure of a head-end node of one or more primary TE-LSPs in a computer network, it is to be understood that various other adaptations and modifications may be made within the spirit and scope of the present invention. For example, the invention has been shown and described herein using a core network architecture with P and PE routers. However, the invention in its broader sense is not so limited, and may, in fact, be used with any TE-LSP and corresponding TE-LSP head-end node. Moreover, while the above description describes performing the technique at the protecting node, which is a provider edge node, the invention may also be advantageously used with PCEs. In addition, while one example of a tunnel is an MPLS TE-LSP, other known tunneling methods include, inter alia, the Layer Two Tunnel Protocol (L2TP), the Point-to-Point Tunneling Protocol (PPTP), and IP tunnels. Also, those skilled in the art will understand that the use of IS-IS, OSPF, RSVP, BFD, various flags, fake tunnels, etc., are representative examples, and that other means for performing elements of the present invention may be used accordingly.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
   establishing a repair label switched path (LSP) for a primary LSP having a head-end node, the repair LSP extending from a neighboring upstream node of the head-end node to a downstream neighboring node of the head-end node in a network;
   detecting a failure of the head-end node;
   rerouting, by the neighboring upstream node, traffic onto the repair LSP, the rerouted traffic to rejoin the primary LSP at the downstream neighboring node;
   refreshing, by the neighboring upstream node, state of the primary LSP to maintain the primary LSP after failure of the head-end node;
   receiving, by the neighboring upstream node, a request from the head-end node to protect the head-end node from failure; and
   establishing the repair LSP in response to the request, wherein the primary LSP is associated with one or more address prefixes, and the rerouting reroutes traffic destined for the one or more address prefixes onto the repair LSP, and wherein the request indicates a selected subset of address prefixes reachable by the head-end node from a routing table and the rerouting reroutes traffic destined for the selected subset of address prefixes onto the repair LSP by associating said selected subset of address prefixes to a backup routing table.

2. The method of claim 1, wherein the refreshing further comprises:
sending, by the neighboring upstream node, replica state control blocks to the downstream neighboring node.

3. The method of claim 2, wherein the primary LSP is signaled using a Resource ReSerVation Protocol (RSVP) protocol, and the replica state control blocks are embodied as RSVP Path messages.

4. The method of claim 2, further comprising:
receiving, by the neighboring upstream node, returned state control blocks.

5. The method of claim 4, wherein the primary LSP is signaled using a Resource ReSerVation Protocol (RSVP) protocol, and the returned state control blocks are embodied as RSVP Resv messages.

6. The method of claim 1, further comprising:
ceasing to refresh the state of the primary LSP in response to reconvergence of the network to account for the failure of the head-end node.

7. The method of claim 1, wherein the request includes one or more flags in an Interior Gateway Protocol (IGP) message.

8. The method of claim 1, further comprising:
learning of the primary LSP at the neighboring upstream node using a tunnel between the neighboring upstream node and the primary LSP.

9. The method of claim 1, wherein the neighboring upstream node is a provider edge (PE) node, and the head-end node is a provider (P) node.

10. An apparatus comprising:
one or more network interfaces;
a processor coupled to the one or more network interfaces and configured to execute software processes; and
a memory configured to store a protection process executable by the processor, the protection process when executed operable to:
establish a repair label switched path (LSP) for a primary LSP having a head-end node, the repair LSP extending from the apparatus to a downstream neighboring node of the head-end node in a network,
detect a failure of the head-end node,
reroute traffic onto the repair LSP, the rerouted traffic to rejoin the primary LSP at the downstream neighboring node,
refresh state of the primary LSP to maintain the primary LSP after failure of the head-end node,
receive, by a neighboring upstream node, a request from the head-end node to protect the head-end node from failure, and
establish the repair LSP in response to the request,
wherein the primary LSP is associated with one or more address prefixes, and the rerouting reroutes traffic destined for the one or more address prefixes onto the repair LSP, and
wherein the request indicates a selected subset of address prefixes reachable by the head-end node from a routing table and the rerouting reroutes traffic destined for the selected subset of address prefixes onto the repair LSP by associating said selected subset of address prefixes to a backup routing table.

11. The apparatus of claim 10, wherein the protection process when executed is further operable to:
send replica state control blocks to the downstream neighboring node.

12. The apparatus of claim 11, wherein the primary LSP is signaled using a Resource ReSerVation Protocol (RSVP) protocol, and the replica state control blocks are embodied as RSVP Path messages.

13. The apparatus of claim 10, wherein the protection process when executed is further operable to:
receive returned state control blocks.

14. The apparatus of claim 13, wherein the primary LSP is signaled using a Resource ReSerVation Protocol (RSVP) protocol, and the returned state control blocks are embodied as RSVP Resv messages.

15. The apparatus of claim 10, wherein the protection process when executed is further operable to:
cease to refresh the state of the primary LSP in response to reconvergence of the network to account for the failure of the head-end node.

16. A non-transitory computer-readable medium having software encoded thereon, the software when executed operable to:
establish a repair label switched path (LSP) for a primary LSP having a head-end node, the repair LSP extending from a neighboring upstream node of the head-end node to a downstream neighboring node of the head-end node in a network;
detect a failure of the head-end node;
reroute traffic received at the neighboring upstream node onto the repair LSP, the rerouted traffic to rejoin the primary LSP at the downstream neighboring node;
refresh state of the primary LSP from the neighboring upstream node,
receive, by the neighboring upstream node, a request from the head-end node to protect the head-end node from failure; and
establish the repair LSP in response to the request,
wherein the primary LSP is associated with one or more address prefixes, and the rerouting reroutes traffic destined for the one or more address prefixes onto the repair LSP, and
wherein the request indicates a selected subset of address prefixes reachable by the head-end node from a routing table and the rerouting reroutes traffic destined for the selected subset of address prefixes onto the repair LSP by associating said selected subset of address prefixes to a backup routing table.

* * * * *